March 26, 1957 E. J. RIVOCHE 2,786,764
NUTRIENT FOOD PRODUCTS AND PROCESS OF PRODUCING SAME
Filed July 7, 1953
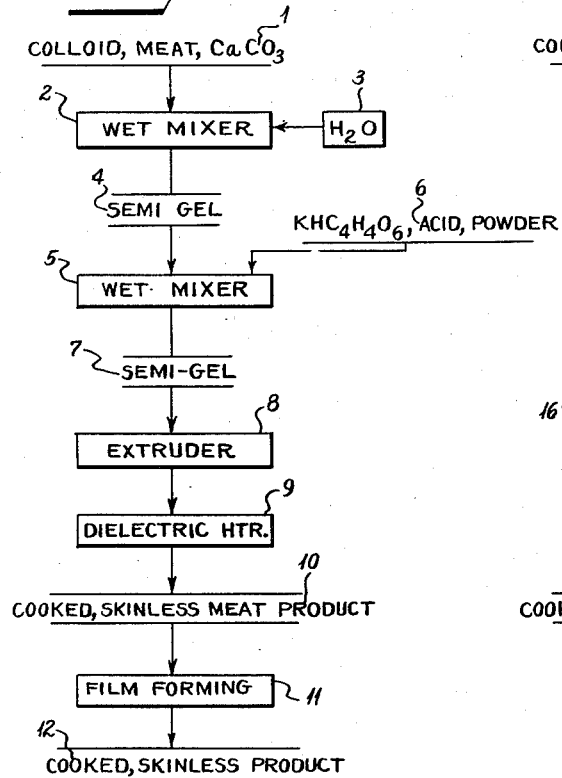
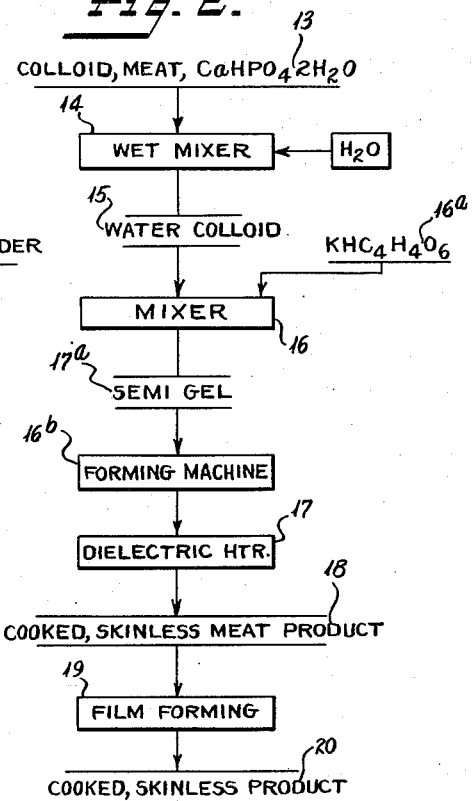
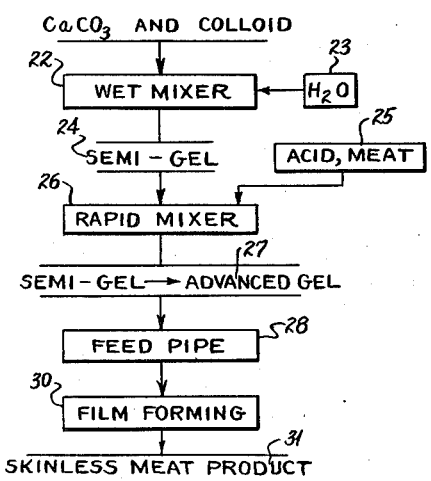
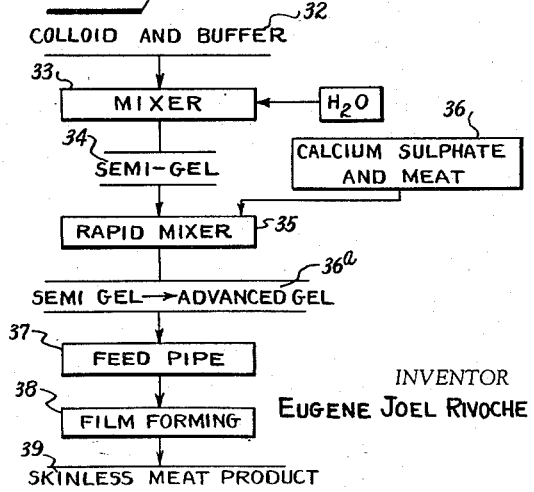
INVENTOR
EUGENE JOEL RIVOCHE
BY Bacon & Thomas
ATTORNEYS United States Patent Office 2,786,764
Patented Mar. 26, 1957

2,786,764
NUTRIENT FOOD PRODUCTS AND PROCESS OF PRODUCING SAME

Eugene Joel Rivoche, Washington, D. C.

Application July 7, 1953, Serial No. 366,537

7 Claims. (Cl. 99—131)

This invention relates to sausage-like food products and, more particularly, to skinless sausage-like food products which derive their mass and structural rigidity from a colloidal gel structure. This application is a continuation-in-part of my co-pending application for Food Products, Serial No. 307,217, filed August 30, 1952.

Since ground meat is not materially water absorbant, it has heretofore been impossible to embody sufficient moisture in sausage-like meat products, such as skinless frankfurters, to prevent excess dryness and a lack of succulence in the finished cooked product. Because fat has a tendency to become rancid upon storing, it has also been impossible to embody desired additional fat in such meat products. Ground meat does not inherently stick together to form a solid mass and it has been customary in the manufacture of sausage-like products to utilize various types of starchy powders and other products as binding compounds. These compounds have a tendency to create molds and are extremely limited in their receptivity of preservatives so that the shelf life of sausage-like products manufactured therewith has heretofore been somewhat limited.

All sausage-like meat products, even those designated skinless, utilize a skin or film of some type to support the meat under sufficient pressure to produce the desired hardness, structure and taste sensation. Such skins further serve to prevent external contamination of the meat product and prevent drying of the meat. It is also desirable that such meat products retain the desired amount of moisture or juice throughout a maximum obtainable shelf life and also during a heating or cooking step.

It is an object of this invention to produce a sausage-like meat product of the so-called skinless type having a high moisture content which is retained throughout shelf life and throughout a heating or cooking operation.

It is a further object of this invention to produce a sausage-like meat product of the aforementioned type which will have an extremely long shelf life.

It is a still further object of the invention to produce a sausage-like food product having no tendency to stickiness so that the product may be conveniently and economically packed.

In my aforementioned co-pending application there were described several methods of producing a food structure from colloidal gel substances. It has now been discovered that it is possible utilizing such processes and variations of the same to produce sausage-like products having the desired consistency, solidity and hardness and having a desired high moisture content and long shelf-life. According to this invention, sausage-like meat products are formed by building up a gel in a meat mass so as to lend to the meat mass the desired consistency and structural characteristics. Since the gel has only a negligible tendency to give off water, the product will not dry out and even if a minor amount of drying does occur, even hard gels have a tendency to pick up moisture and become soft and juicy under the influence of heat. The taste sensation received upon chewing a gel is that of a juicy and not a dry substance so that one eating the new sausage-like product will receive the same taste sensation as would be achieved through a high moisture content of the meat itself. The gel may also be made the carrier for any suitable type of preservatives which may be added in any desired amount, so as to give an extremely long shelf life to the product. This has hitherto been practically impossible since known preservatives could not be successfully added to the starches utilized in previous sausage-like food products or to the meat itself. It is also a feature of this invention that skins or films of any desired degree of imporosity may be formed on sausage-like products to greatly extend the shelf life thereof and to further guard against the loss of moisture therefrom.

Further objects and advantages of the invention will become clear upon reference to the following description and drawings wherein:

Figure 1 is a flow diagram of one embodiment of the invention;

Figure 2 is a flow diagram of a second embodiment of the invention;

Figure 3 is a flow diagram of a third embodiment of the invention; and

Figure 4 is a flow diagram of a fourth embodiment of the invention.

According to my copending application, there are three basic means of forming a gel structure within which various types of food particles may be embodied. The first means is to incorporate an insoluble salt of an edible alkaline earth metal in a pasty water mixture of the food product which includes a suitable colloid to lend the desired consistency characteristics to the paste.

An edible acid is subsequently uniformly distributed throughout such paste to institute the formation of an advanced gel. Between the institution of such action, and the actual setting of the advanced gel, the substance is formed into its final shape since after it reaches the stage of an advanced gel it may not be formed but may merely be sliced or cut.

According to the second process of forming the desired type of gel structure, a suitable colloid and a passenger buffer are uniformly dispersed in water to form a colloidal solution. Into this colloidal solution is introduced an edible soluble salt of an alkaline earth metal, as for instance calcium lactate, precipitated calcium sulphate or calcium phosphate, which is intermixed with the desired meat. Upon intermixing the salt and the colloidal solution, gelatinization is immediately instituted and proceeds at a rate determined by the temperature and by the nature and amount of the passenger buffer utilized.

According to the third method a water colloid solution having meat and an insoluble salt of an edible alkaline earth metal dispersed therein has added thereto a solubilization agent or combination of such agents which will, by solubilizing the salt, create the desired consistency in the mixture to allow handling and cutting and which will upon heating liberate all of the insoluble salt to cause the institution of advanced gelatinization.

In Figure 1 there is shown one embodiment of the invention wherein formation of the advanced gel occurs upon heating. According to this method, a dry mixture 1 of a suitable colloid, such as an algin or pectin or any of those mentioned in my copending application, with a ground meat, and a suitable salt, such as calcium carbonate, is delivered to a wet mixer 2 which receives water from a source 3. The water colloid solution 4 resulting from such mixing is then sent to a wet mixer 5 which receives a mixture 6 of citric acid and potassium bitartrate and in this wet mixer the water colloid solution becomes semi-gel-like through the action of the citric acid but does not become an advanced gel since the potassium bitartrate is substantially insoluble in low or room temperature water. The semi-gel-like output 7 of the mixer 5 then goes to a forming machine or extruder 8 which forms the semi-gel-like mass into the desired cross-sectional shape. Located at the output end of such extruder or forming device 8 are the applicator plates or electrodes of a dielectric heating apparatus 9. By means of such dielectric heating apparatus or any other suitable heating means, the meat is heated or cooked while the semi-gel-like mass is simultaneously transformed into an advanced gel or coagulum. The resulting product is a cooked, skinless sausage-like meat product 10. This product 10 is then fed to a film-forming step 11 which may be performed in any one of a number of different ways to be fully described hereinafter. The resulting product 12 from said film-forming step has an extremely long shelf life and will retain its high moisture content over a long period of time.

In Figure 2 there is shown a variation of the process of Figure 1, wherein the salt used is di-calcium phosphate which has an extremely slight solubility in both hot and cold water, and the only acid used is potassium bitartrate, which is very slightly soluble in room temperature water but highly soluble in hot water. The colloid, meat and di-calcium phosphate are premixed at 13 and fed to a wet mixer 14 where water is added to produce a water colloid 15 which is fed to a further mixer 16 into which is fed the potassium bitartrate 16ª. A thickening is at once instituted as a result of the slight solubilities of the di-calcium phosphate and potassium bitartrate and the semi-gel 17ª is fed to an extruder or forming machine 16ᵇ and thence to a dielectric heating apparatus 17 to form a cooked or heated skinless sausage-like meat product 18. The product 18, as in the preceding example, is then fed to a film-forming step 19 to yield the finished meat product 20. In this embodiment of the invention the slight solubility of potassium bitartrate in cold water is sufficient to increase the slight solubility of the di-calcium phosphate in cold water in order to give the desired viscosity to the semi-gel-like substance. On heating the semi-gel-like substance, the solubility of the potassium bitartrate increases seventeenfold so as to cause sufficient di-calcium phosphate to dissolve to bring about advanced gelatinization.

In Figure 3 there is shown an embodiment of the invention wherein the gel is formed without the use of a heating step. In this embodiment, a premixed powder containing an edible insoluble salt of an alkaline earth metal and a suitable colloid, is fed to a wet mixer 22 where it is mixed with water 23 to form a semi-gel-like substance 24. The acid and meat mixture 25 and the semi-gel-like substance 24 are then simultaneously fed to a high-speed mixer 26 wherein the gelatinization process begins. While the gelling substance 27 in the rapid mixer is still fluid, it is rapidly fed into a feed pipe 28 where the advanced gel forms. The sausage-like food product emanating from the feed pipe is then fed to a film-forming step 30 to produce the desired skinless sausage-like meat product 31.

In Figure 4, there is shown a third embodiment of the invention wherein gel formation is brought about through the use of a soluble salt of an edible alkaline earth metal. According to this variation a mixture 32 of a suitable colloid, such as an algin or pectin, and a passenger buffer, such as sodium phosphate is fed to a mixer 33 wherein a water colloid solution is formed. This semi-gel-like substance 34 is then introduced into a high speed mixer 35 which simultaneously receives a uniform mixture 36 of a soluble salt, such as calcium sulfate, and a ground or comminuted meat. The formation of an advanced gel is instituted in mixer 35 and before such forming gel 36ª has had time to set, it is fed to a feed pipe 37 wherein final gelatinization occurs. The sausage-like product is then fed to a film forming or hardening step 38 to yield the desired skinless meat product 39. Whereas the buffer was added to the colloid in this process, it will also be apparent that it could equally well be mixed with the calcium lactate and as pointed out in my copending application, the buffer may be dispensed with entirely if the temperature and mixing speeds of the process are carefully controlled.

In the foregoing embodiments of the invention, the sausage-like product has been described as being fed directly from the feed pipe or extruder to the film-forming step. It will be understood, however, that a cutting or forming step is necessary in the process and it is most conveniently performed while the advanced gel is forming, since, once set, an advanced gel or coagulum may not be molded but may only be cut. A cutting device or forming device, such as, for example, those disclosed in my copending application No. 329,797, filed January 6, 1953, is located at the output end of the feed pipe to operate upon the meat product before gelatinization is completed. It will be recognized that such cutting of forming devices might be located elsewhere in the process depending upon the product desired, that is, if frankfurters are being extruded, rounded ends are desired and forming must necessarily occur prior to setting of the gel, whereas if meat patties are being formed, slicing could occur at later stages of the process.

Following the formation of the film, skin or hardened surface according to the foregoing embodiments of the invention, it is necessary, prior to packaging, to allow a small amount of air drying time to completely eliminate the possibility of any sticking of the product. If the processing time is long enough, the air drying will occur as the product is handled and fed to a packaging machine; however, it has been found advantageous in most installations to provide for forced air drying at temperatures ranging up to about 90° C.

In all embodiments, the rate of formation of the gel may be readily controlled through the use of a suitable passenger buffer as is fully explained in my co-pending applications Nos. 307,217 filed August 30, 1952, and 329,795 filed January 6, 1953.

The sausage-like meat product yielded by any of the foregoing processes prior to the film-forming or surface hardening step may be utilized as a satisfactory food product in that form. It is desirable, however, in order to achieve the maximum storage life and in order to produce the juicy product desired, to form a film, skin or hardened surface over the sausage-like product. It will be understood that this film or skin is not such a skin as would destroy the "skinless" nature of the product, but is an extremely thin film or surface hardening which serves many purposes hereafter to be described.

In the sausage-like products produced heretofore, the amount of preservative which it was possible to use to prevent external contamination or fermentation was extremely limited when considered as a percentage of the weight of the food product. According to the present invention, however, it is possible to utilize an extremely high concentration of preservative in the film, skin, or hardened surface around the sausage-like product because of the fact that such skin forms only a minute part of the sausage and it has been found that embodying the preservative in such skin yields very satisfactory protection to the meat there enclosed.

An extremely thin skin, film, or surface of the desired non-porous type may be formed by passing the sausage-like product through a plasticizer solution, such as a glycerin solution, to form a smooth, non-porous film on the colloidal gel surface. The film produced in this manner is non-porous and will prevent the moisture within the sausage-like product from escaping. Preservatives of any desired nature may be added to the plasticizer solution in the manner aforedescribed. The concentration of such glycerine baths may be varied over wide limits bearing in mind that too small a concentration will unduly prolong the dip time whereas too high a concentration is uneconomical. A preferred range, wherein the dip time is about 30 seconds, is from about 3 to 10% glycerine solution.

A further method of providing a satisfactory film is to utilize an excess of the edible alkaline earth salt, such as a calcium salt, in the preparation of the advanced gel substance. This can be done with any of the aforementioned embodiments of the process of this invention. The sausage-like product containing such an excess of calcium ions is then passed through a colloid bath, such as an algin bath, wherein a film is formed whose thickness and hardness is dependent upon the concentration of colloid present in the bath, and upon the quantity of free calcium ions present in the meat mass. Generally speaking, a concentration of from about 1 to 2% algin has been found satisfactory, it being borne in mind that lower concentrations merely produce thinner films whereas higher concentrations increase the thickness and hardness of the film. Such bath may be saturated with any amount of preservatives to give the desired protection to the food product and may also contain plasticizers such as glycerin.

A still further method of forming the desired surface condition is to pass the sausage-like food product through a bath containing a soluble salt of an edible alkaline earth metal, such as a soluble calcium salt, and this salt will cause a further hardening of the surface of the colloidal gel substance. The amount and depth of the hardening may be controlled by controlling the concentration of the salt bath and the time of contact between such bath and the sausage-like food product. Generally speaking, baths containing concentrations from 3% and up of calcium sulfate or calcium chloride are satisfactory, the lower limit being determined by the available dip time and minimum acceptable film hardening and the upper limit by the solubility of the salt. Where calcium chloride is used, a subsequent water rinse is desirable. The salt bath also may carry the desired preservative and a plasticizer.

A still further alternate method of forming the desired film comprises passing the sausage-like food product through a bath containing a suitable colloid, such as an alginate, and then passing the sausage-like product through a bath containing a soluble salt of an edible alkaline earth metal, such as calcium. As in the preceding film-forming step, the desired preservatives may be embodied in either of the baths and the bath concentrations are similar. Conversely, this method of forming the film may entail passing the sausage-like product through a weak bath of salt of an edible alkaline earth metal, such as a calcium salt, and then passing such food product through a bath containing a suitable colloid, such as an alginate.

In addition to bringing about surface hardening and film formation through the use of calcium salts, it is also possible, though less desirable, to effect such changes through the use of acidic or alkaline baths. Thus surface hardening may be accomplished by passing the sausage-like product containing an excess of gelatinization agent through an acid bath, such as a bath having a pH of about 3 and no higher than 3.5 or 4.0; or through a basic bath, such as a bath having a pH of 8 or higher. The concentration of such solutions should be approximately 3% or higher. In a similar manner, a film may be formed by passing the sausage-like product through such baths and then through a solution of a suitable colloid. Conversely, the sausage-like product might be first passed through the colloid bath and then through the acidic or alkaline bath.

While the foregoing methods of forming the desired film structure have disclosed the use of various types of baths, it will be apparent that the same effect may be produced by spraying the same solution onto the sausage-like food product.

Although the formation of a film through the use of a plasticizer solution, such as glycerin, has been disclosed as an alternative to the other film-forming steps disclosed, it is also possible to utilize the plasticizer solution in addition to any of the other film-forming steps. Where such a dual film-forming step or series of steps is utilized, an extremely non-porous film is formed which will lend extreme shelf life to the product. It will be understood that the word "film" is used in a broad sense and comprehends surface hardening and conditioning without the actual formation of an additional outer film. It is still further possible to introduce glycerin into the original gellification mixture thereby eliminating the necessity of a special glycerin bath.

In manufacturing sausage-like food products containing a water gel in the foregoing manner, it is possible to improve the quality of the product by saturating the water from which the gel is made with any desired coloring, flavoring, fat emulsion, or even with vegetable fats, as well as with any desired food preservatives, spices or additives.

The following are examples of the foregoing processes:

*Example I.*—Sausages were made using the following materials:

1.5 grams algin
0.25 gram calcium carbonate
100 grams water
100 grams sausage meat
0.4 gram citric acid
2% calcium chloride bath 1.5 grams of a standard algin of light or medium viscosity was mixed with 0.25 gram of calcium carbonate. 100 grams of water at room temperature were placed in a high speed mixer and the mixture of algin and calcium carbonate added. The mixing was allowed to continue for two to five minutes and while the mixer was still running a mixture of 100 grams of sausage meat and 0.4 gram of citric acid was rapidly poured in. The mixer was run for five to ten more seconds and while the mixture was still in a semi-fluid state, it was poured into a feed pipe. The semi-fluid mixture formed an advanced gel between two and ten minutes and was sliced and the pieces fed to a 2% calcium chloride bath where they were allowed to remain for about a minute. The sausages were then rinsed in water and dried in air at 90° F. and packaged.

*Example II.*—Sausages were made using the following materials:

1.5 grams algin
0.2 gram tetrasodium pyrophosphate
100 grams water
100 grams sausage meat
0.4 gram precipitated calcium sulphate
1.5% algin bath
2% calcium lactate bath 1.5 grams of a standard algin of light or medium viscosity was mixed with 0.2 gram of tetrasodium pyrophosphate. 100 grams of water at room temperature were placed in a high speed mixer and the mixture of algin and tetrasodium pyrophosphate added. The mixing was allowed to continue for two to five minutes and while the mixer was still running a mixture of 100 grams of sausage meat and 0.4 gram of precipitated calcium sulphate were added. The mixer was run for five to ten more seconds and while the mixture was still in a semi-fluid state, it was poured into a feed pipe. The advanced gel was sliced and dipped in a 1.5% algin bath and thereafter allowed to remain in a 2% calcium lactate bath for one minute. The sausages were then dried in air at 90° F. and packaged.

*Example III.*—Sausages were made using the following materials:

1.5 grams algin
0.1 gram calcium carbonate
100 grams water
100 grams sausage meat
0.18 gram citric acid
0.3 gram potassium bitartrate
3% glycerine, 2% calcium chloride bath 1.5 grams of a standard algin of light or medium viscosity was mixed with 0.1 gram of calcium carbonate and this mixture mixed with 100 grams of water at room temperature for two to five minutes. While the mixer was still running, a mixture of 100 grams of sausage meat, 0.18 gram of citric acid and 0.3 gram of potassium bitartrate was added and stirred for about ten more seconds. The mixture was then fed to a feed pipe and extruded past the electrodes of a dielectric heater to cause advanced gel formation. The sausages emanating from the extruder were then cut and dipped in a 3% glycerine 2% calcium chloride bath for about 30 seconds and dried as in the foregoing examples.

*Example IV.*—Hamburgers were made using the following materials:

1.5 grams algin
100 grams water
100 grams ground meat
0.3 gram calcium phosphate
0.3 gram potassium bitartrate
2% calcium chloride bath 1.5 grams of algin were mixed with 0.3 gram of calcium phosphate and 100 grams of water at room temperature for about three minutes and while the mixer was still running a mixture of 100 grams of sausage meat and 0.3 gram of potassium bitartrate were added. The mixer was allowed to run for about ten more seconds and the mixture was then fed to a feed pipe and extruded past the electrodes of a dielectric heater to cause advanced gel formation. The emanating product was sliced in hamburger patty thickness and dipped in a 2% calcium chloride bath for about one minute. The patties were then water rinsed and dried in hot air at 90° F.

*Example V.*—Hamburgers were made using the following materials:

0.5 gram algin
100 grams water
1.5 grams calcium sulfate
0.2 gram trisodium pyrophosphate
100 grams ground meat
2% calcium chloride bath 0.5 gram of algin were mixed with 0.2 gram of trisodium pyrophosphate and 100 grams of water at room temperature for about three minutes and while the mixer was still running a mixture of 100 grams of ground meat and 1.5 grams of calcium sulfate were added. The mixer was allowed to run for about ten more seconds and while the mixture was still in a semi-fluid state, it was poured into a feed pipe. The advanced gel was sliced and dipped in a 2% calcium chloride bath and thereafter rinsed with water. The hamburger patties were then dried in air at 90° F. and packaged.

While the foregoing examples show workable formulas, it is to be understood that variations in amounts of meat, algin and gelatinization agents may readily be made in view of the product which it is desired to obtain. Thus, high or low meat concentrations may be used as well as products of a softer or harder nature. The hardness is readily controlled through variation of algin and calcium concentrations and it is also possible to use a wide range of gelatinization agents.

In addition to adding spicing, coloring, flavoring, preservatives, antioxidants, anti-molding agents, etc., to the colloidal gels, such materials may also be included in the various baths utilized so as to impart the desired taste, color and life to the products.

Whereas this invention has been described in terms of specific steps and specific substances, it is to be understood that such description has been for illustrative purposes only. Thus it is possible to utilize the processes of this invention to form hamburgers and fish cakes. The non-sticky nature of the advanced gel or coagulum facilitates economical packing by making it possible to stack such products in contacting relationship without any possibility of sticking when the consumer unpacks the product. It will be understood that with patty-like products, the film formation will occur over the planar surface of the food as well as over its cylindrical surface.

It is to be understood that while theories of the various gel formations and reactions have been set out in this application, such theories are only apparent explanations and are not to be deemed limiting in any sense. The observable phenomena disclosed will occur in the manner set out regardless of the underlying theory and the invention is to be deemed limited only by the scope and spirit of the appended claims.

I claim:

1. A process of preparing a coated food product, comprising the steps of dispersing meat particles in a thixotropic semi-gel-like mass comprising a water solution of a hydrophilic colloid, subjecting said mass to the action of free alkaline earth metal ions to cause formation of a gel structure while maintaining said meat particles homogeneously dispersed therein, forming said mass into shaped pieces, contacting said shaped pieces with a further water solution of a hydrophilic colloid to form a colloid film over the surface of said shaped pieces and subjecting said colloid film to the action of free alkaline earth metal ions to cause said film to form a relatively imporous advanced gel coating on the surface of said shaped pieces.

2. The process of claim 1, wherein the hydrophilic colloid is an alginate and wherein an edible alkaline earth metal compound is incorporated in the mass prior to contacting said shaped pieces with said further solution of a hydrophilic colloid in sufficient quantity to provide said alkaline earth metal ions for action upon the colloid film to form said advanced gel coating.

3. The process of claim 1, wherein said shaped pieces are contacted with a solution of an edible salt of an alkaline earth metal prior to contacting said pieces with said further solution of hydrophilic colloid to thereby provide said free alkaline earth metal ions for action upon said colloid film.

4. The process of claim 1, wherein said shaped pieces after contacting with said further solution of hydrophilic colloid are contacted with a solution of an edible salt of an alkaline earth metal to provide said free alkaline earth metal ions for action upon said colloid film.

5. The process of claim 1 including the step of drying the surface of the gel-coated pieces.

6. The process of claim 1, wherein said further water solution of a hydrophilic colloid contains at least one edible additive.

7. A gel-coated food product prepared by the process of claim 1.

References Cited in the file of this patent

UNITED STATES PATENTS

| Number | Name | Date |
| --- | --- | --- |
| 2,036,922 | Clark et al. | Apr. 7, 1936 |
| 2,233,574 | Baker et al. | Mar. 4, 1941 |
| 2,334,281 | Olsen et al. | Nov. 16, 1943 |
| 2,373,729 | Willaman | Apr. 17, 1945 |
| 2,403,547 | Peschardt | July 9, 1946 |
| 2,441,729 | Steiner | May 18, 1948 |
| 2,634,212 | Komarik | Apr. 7, 1953 |